UNITED STATES PATENT OFFICE.

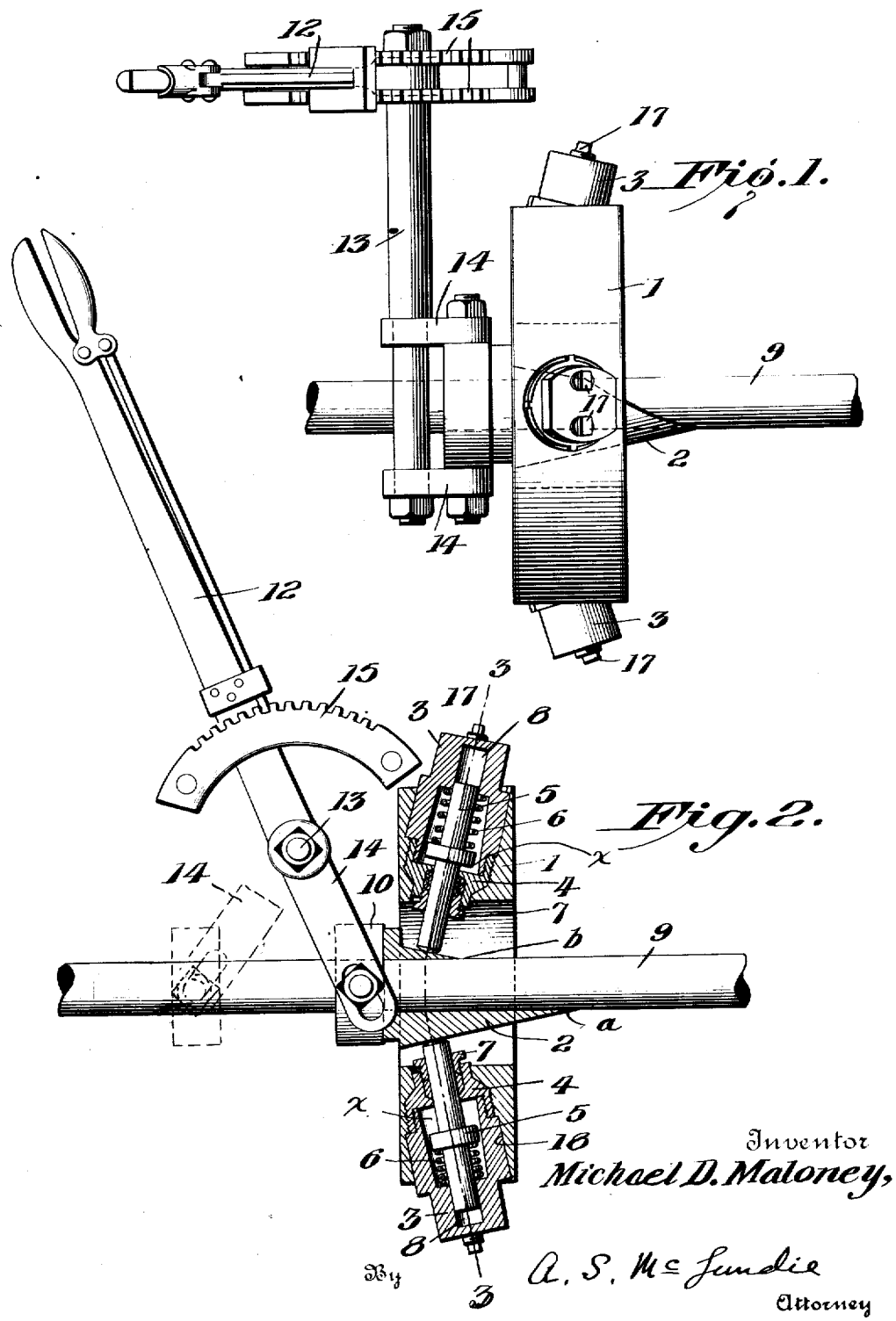

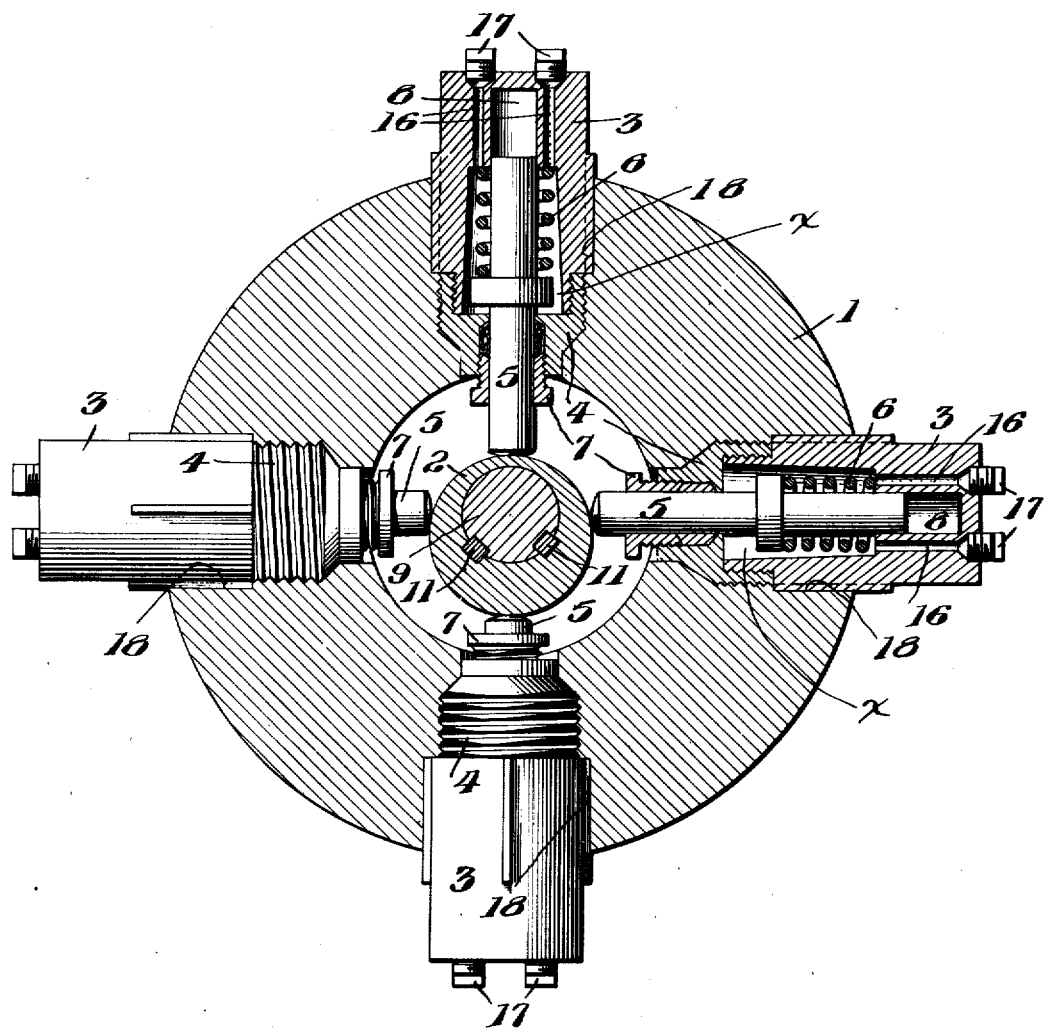

MICHAEL D. MALONEY, OF HADLOCK, WASHINGTON.

MECHANICAL BRAKE.

1,398,875. Specification of Letters Patent. Patented Nov. 29, 1921.

Application filed February 20, 1920. Serial No. 360,124.

*To all whom it may concern:*

Be it known that I, MICHAEL D. MALONEY, a citizen of the United States, residing at Hadlock, in the county of Jefferson and State of Washington, have invented certain new and useful Improvements in Mechanical Brakes, of which the following is a specification.

This invention relates to improvements in brakes, and particularly to brakes which are used or employed for the regulating, controlling or stopping or bringing to rest of a moving vehicle, such as an automobile, automobile truck or street railway car or other similar self-or-otherwise propelled vehicle and maintaining it in a controlled or stopped condition at the option of the operator.

One of the objects of the brake is to provide a mechanism which has one or more cylinders containing a non-compressible or partly-compressible substance as a light oil or other suitable fluid, and one or more pistons engaged in the cylinders for displacing and causing the fluid to flow through a varying orifice. The flowing of the fluid causes resistance which acts to consume the power of the medium operating the pistons, which with this brake is the vehicle whose movement is to be controlled or stopped.

Another object is to provide a brake which does not operate on separate wheels, as is done by the ordinary type of band, tire or rim brake commonly used on vehicles, but is to act on the shaft or axle which is driving the wheels of the vehicle or is being driven by them. This brake permits of resistance being applied equally to each wheel which is in connection with the shaft or axle, and does not permit of the entire resistance being applied to one wheel as is possible with a tire or band brake when improperly adjusted.

Another object is to provide a brake in which the resistance is not obtained by wearing parts as brake shoes, brake linings and the like, but is secured by the action of a fluid in action of flowing under pressure.

With the foregoing objects outlined and with other objects in view the invention consists in the novel features hereinafter described in detail, illustrated in the accompanying drawings and more particularly pointed out in the appended claims.

In the drawings:—

Figure 1 is a plan view of the assembled brake and lever mechanism.

Fig. 2 shows a longitudinal cross section of the brake assembled on the shaft or axle in position of operation, and the lever mechanism, of ordinary design for its manipulation.

Fig. 3 is an enlarged transverse cross section taken on line 3—3 of Fig. 2, showing the brake mechanism in position of operation. A side view of two of the cylinders is shown.

Referring to the drawings, the brake consists of the cylinder housing 1; the actuator 2; the cylinders 3; the cylinder heads 4; the piston with piston heads 5; the piston return springs 6; the piston packing glands 7; the piston guide and air cushion cylinders 8; the driving shaft or axle 9, which is not part of the brake, but on which the actuator is assembled; a thrust bearing 10; feathers or keys 11 for driving the actuator in connection with the shaft or axle 9; the brake operating lever mechanism 12, 13, 14 and 15; the cylinder filling holes 16; the cylinder filling hole plugs 17; and 18 represents the bores in the cylinder housing.

The cylinder housing 1 consists of a forging or casting of shape and size to permanently, conveniently and rigidly attach to the vehicle at such a location that the driving shaft or axle of the vehicle passes through it and is free to revolve as no part of the housing is in contact therewith, or it can be made integral with that portion of the frame or body of the vehicle in which the shaft or axle has bearings or revolves or is in proximity if conveniently located to suit the purpose as is the transmission casing or the differential gearing housing as used in an automobile or automobile truck which housing or casing surrounds the shaft but allows the shaft to revolve and to pass through and extend to either end thereof. The cylinder housing 1 is prepared for one or more cylinders 3 by preparation of the cylinder seats 18. These cylinder seats are prepared in the cylinder housing to permit assembling or disassembling of the cylinders at will, but the cylinders are securely retained in their seats by being screwed thereinto or by other method, and these seats are so prepared that the pistons when assembled with the cylinders in the housing radiate from the center of the driving shaft or axle 9 which carries the actuator and are also set at such an angle that a line through their axes is perpendicular to the side of the actuator which they are in contact with or in proximity to. The actuator 2 in form is cone-shaped in part with such angle to its sides as depends on the work to be performed and the length of longitudinal travel it is desired to have. It has a hole for the driving shaft or axle bored longitudinally through it and arranged parallel to and at one side of the axis of the cone—this makes possible an eccentric movement when the cone revolves with the shaft. The maximum amount of throw of the eccentric corresponds to the difference between the greatest and least radius measured from the axis or center of the shaft. It is seen that by locating the shaft hole off center in the cone and boring same parallel with the axis thereof the shaft hole when continued throughout the full length of the actuator cuts away a part of its side. When assembled on a shaft this permits the cone surface to merge into the shaft. The actuator 2 is assembled on the driving shaft or axle 9 of the vehicle to be braked and is free to slide longitudinally along the shaft or axle at the option of the operator, and is made to revolve with the shaft or axle by the feathers or keys 11. The cylinders 3 are cylindrical in form, being prepared for assembly in the cylinder housing 1 in which they are held in place. A cone shaped cavity $x$ is provided in the cylinder to accommodate the piston and piston head, the piston return springs 6 and the fluid used to create resistance. The outer end of the cylinder is preferably left solid in the manufacture, or it can be plugged after manufacture if desired. The inner end of the cylinder is closed after assembly of the piston 5 and the piston return spring 6 by the cylinder head 4, and the fluid is restrained from escaping around the piston by packing held by the piston packing gland 7. Certain clearances are made to exist between the sides of the piston head and the side walls of the cylinder cavity $x$, through which the fluid must pass as it is displaced by inward and outward movement of the piston and piston head 5. This clearance between the cylinder wall and piston head will depend on the length of stroke desired or obtainable by the piston, the number of strokes per unit of time, and their accelerations. These factors will govern the work done by the pistons in displacing the fluid, making the device a brake by reason of the resistance of the fluid in the cylinders to movement through the decreasing orifice or clearance.

The above being a description of the parts composing the brake, the following describes the application and action of same.

All cylinder seats prepared in the housing in which cylinders are not required will be plugged. For purpose of description it is understood that the cylinder cavity $x$ is filled with a fluid such as light oil which will flow when acted upon by gravity or a greater force. When the brake lever is at the position indicated by the dotted lines in Fig. 2, the actuator 2 is free to revolve with the driving shaft or axle 9 and its eccentric motion is not imparted to the pistons which are free and forced to come inward under the influence of the springs 6 to a position which is established and maintained by contact of the piston heads with the cylinder heads 4. If a slight braking effect is desired by the operator, the actuator is forced along the shaft 9 in the direction of the brake by movement of the brake lever device. The actuator which is revolving with the shaft is revolving eccentrically in respect to the shaft and in its revolutions the eccentric portion when it engages the pistons 5 imparts to them an outward motion. This outward motion displaces the fluid in the outward end of the cylinder cavity forcing it by the piston head through the clearance provided between it and the cylinder wall. When the eccentric part of the actuator has passed the piston in its revolutions the piston is returned to its former innermost position by the influence of the piston return springs which have been compressed by the outward movement of the piston, and the fluid is forced back again to the outward end of the cylinder through the clearance around the piston head. Each succeeding revolution of the driving shaft 9 with the actuator in this position is similar to the first described. The flow of the fluid from the end of the cylinder under pressure of the piston head is permitted by the clearance between the piston head and the wall of the cylinder. Great resistance is offered to the flow of the liquid under pressure by the decreasing clearance or decreased size of the orifice, and any resistance desired can be obtained by decreasing or increasing this clearance. When it is desired to increase the braking effect, the actuator is forced still farther inward toward the brake along the shaft 9 by operation of the brake mechanism lever. This further inward movement of the actuator along the shaft adds length to the stroke of the pistons as the increased size of the actuator comes in contact therewith causing a greater length of the flow of the liquid in the cylinder and maintaining the resistance offered for a longer period of time, and also increasing the resistance by the decrease in the clearance between the piston head and the cylinder walls. This clearance is to be determined by trial for vehicles of different weight, and will depend on the length of the stroke of the piston permitted by the actuator. As shown in Fig. 2, when the point marked $a$ is in contact with the pistons 5 the minimum amount of stroke of the piston is made possible by the revolving actuator. As the actuator is forced inward toward the brake along the shaft the possible stroke made to the pistons 5 by the revolving actuator is increased until the point as marked $b$ on the actuator is reached. At this point the maximum possible stroke is reached, and the further movement of the actuator along the shaft by the operation of the brake lever does not increase the stroke of the piston, but changes the location of the maximum stroke of the piston in the cylinder. By changing the location of the piston stroke in the cylinder it is possible to bring the piston head into position to operate in the cylinder cavity where has been prepared such slight clearance between it and the cylinder walls that is it practically impossible for the fluid to pass from end to end of the cylinder cavity, past the piston head, thereby making further movement of the piston engaged in displacing the fluid extremely difficult and resisting the influence of the actuator to further move the piston. This causes a positive brake on the actuator which, on account of its eccentricity cannot revolve, and through it to the driving shaft, and in turn through the driving shaft to the vehicle which through its inertia or momentum is revolving the shaft.

While the actuator is claimed as a novel component of the whole brake, the principle of the brake can be employed and the mechanism less the actuator used to brake a vehicle as described above by using any eccentric now in use or heretofore invented which develops at the option of the operator a reciprocating stroke of varying length.

What I claim and desire to secure by Letters Patent is:—

1. In combination, a shaft member, a housing member coöperating with said shaft member, a chamber provided in said housing member, a piston mounted in said chamber and having a rod extending toward said shaft member, means in said chamber for yieldingly urging said rod toward said shaft member, one of said members being rotatable, a conical eccentric member mounted on one of said members, and means for moving one of said members co-axially relatively to the other members whereby said rod will be brought into engagement with said eccentric member.

2. The combination with a rotatable shaft, of a housing surrounding the same and provided with a chamber, a piston movably mounted in said chamber and having a rod extending toward said shaft, means located in the chamber for yieldingly urging said rod toward said shaft and a conical eccentric slidably mounted on said shaft and movable toward and away from said housing.

3. A combination as defined in claim 2 in which the axis of the rod is arranged perpendicular to the surface of the conical eccentric.

4. A combination as defined in claim 2, in which the means for yieldingly urging the rod toward the shaft includes a coiled spring which bears against said piston.

5. The combination with a shaft member, of a housing member surrounding said shaft member and provided with a chamber, a piston mounted in said chamber and provided with a rod extending toward said shaft member, means for yieldingly urging said rod toward said shaft member, a conical eccentric mounted on said shaft member and means for relatively moving said eccentric and housing member whereby the eccentric is brought into engagement with said rod.

6. A combination as defined in claim 5, in which the axis of the rod is arranged perpendicular to the conical surface of the eccentric.

7. A combination as defined in claim 5, in which the means for yieldingly urging the rod toward the shaft member, includes a coiled spring surrounding the rod and engaging the piston.

8. In combination a shaft member, a housing member surrounding the same and provided with an internal chamber having a tapered wall, a piston mounted in the chamber and movable toward and away from the shaft member, the piston in moving away from the shaft member entering the smaller end portion of said chamber, means located in the chamber for yieldingly urging the piston toward said shaft member, a rod coöperating with the piston, a conical eccentric member mounted on said shaft member and means for moving one of said members co-axially relatively to one of the other members whereby the rod and said conical eccentric member will be brought into engagement.

9. A combination as defined in claim 8, in which the means for yieldingly urging the piston toward the shaft member includes a coiled spring surrounding said rod.

10. The combination with a shaft member, of a housing member surrounding the same and provided with a radial bore, a cylinder mounted in said bore and having a tapered chamber merging into a cylindrical chamber, a rod mounted in said cylinder, having its inner end movably mounted in the cylindrical chamber and its outer end extending exteriorly of the cylinder toward said shaft member, a cylindrical piston fixed to said rod and located within the tapered chamber, a conical eccentric member mounted on said shaft member, and means for moving one of said members co-axially relatively to one of the other members whereby the outer end of said rod will be brought into engagement with said eccentric member.

11. A combination as defined in claim 10, in which the axis of the rod is perpendicular to the conical surface of the eccentric member.

12. A combination as defined in claim 10, in which the chamber of tapered shape is provided with a filling conduit and a removable plug closes said conduit.

MICHAEL D. MALONEY.